United States Patent

Robinson

[11] Patent Number: 5,926,104
[45] Date of Patent: *Jul. 20, 1999

[54] SELECTIVE CALL DEVICE AND METHOD OF SUBSCRIBING TO INFORMATION SERVICES

[75] Inventor: Edward Herbert Robinson, Ft. Worth, Tex.

[73] Assignee: Motorola, Inc., Schaumburg, Ill.

[*] Notice: This patent is subject to a terminal disclaimer.

[21] Appl. No.: 08/791,043

[22] Filed: Jan. 28, 1997

[51] Int. Cl.$^6$ .................................................. G08B 5/22
[52] U.S. Cl. ................................. 340/825.22; 455/38.1; 455/38.4; 340/825.44
[58] Field of Search ..................... 340/825.44, 825.38, 340/825.22; 455/38.1, 38.4

[56] References Cited

U.S. PATENT DOCUMENTS

| | | | |
|---|---|---|---|
| 5,131,020 | 7/1992 | Liebesny et al. | 379/59 |
| 5,398,021 | 3/1995 | Moore | 340/825.44 |
| 5,504,476 | 4/1996 | Marrs et al. | 340/825.44 |
| 5,555,446 | 9/1996 | Jasinski | 340/825.44 |
| 5,694,120 | 12/1997 | Indekeu et al. | 455/38.1 |

*Primary Examiner*—Michael Horabik
*Assistant Examiner*—Jean B. Jeanglaude
*Attorney, Agent, or Firm*—Keith A. Chanroo

[57] ABSTRACT

A selective call device (200) has a preassigned address port and a plurality of assignable sub-address ports (246), a receiver (204) for receiving a directory of information services and designated address assignments corresponding to the directory of information services on the preassigned address port and a user interface (216) for selecting an information service from the directory of information services to be received on an assignable sub-address port corresponding to a designated address assignment. The selective call device (200) also has transmitter (208) for transmitting a selection of a selected information service, a programmer (244) for programming the assignable subaddress port in response to a receipt of an authorization and for disabling the assignable sub-address port when a time period for the selected information service has expired and the receiver (204) for receiving the selected information service on the assignable sub-address port (246.

18 Claims, 4 Drawing Sheets

SELECTIVE CALL DEVICE AND METHOD OF SUBSCRIBING TO INFORMATION SERVICES

FIELD OF THE INVENTION

This invention relates in general to communication systems and more specifically to a method in a selective call devices for subscribing to information services.

BACKGROUND OF THE INVENTION

A conventional selective call receiver, e.g., a pager, often can receive messages from more than one sources. Sources are distinguished from each other typically by address information associated with each message or information service. When the address information correlates, or matches, a predetermined address in the selective call receiver, the selective call receiver receives and stores the message from a particular information source. In an audible mode, each predetermined address, i.e., each source, can be configured to invoke an audible alert having a cadence, or pattern, that is distinguishable from other predetermined address, i.e., other sources. For example, a user can distinguish messages received from different sources by the cadence of the audible alert. Optionally, a visual indicator on a display can provide the visual alert for identifying the particular source. This method of receiving and presenting messages, and identifying sources, to the user is well known in the art.

The predetermined address in the selective call receiver is normally preconfigured by the service center or the manufacturer. Hence, the predetermined address is normally fixed and unchangeable by the user. Normally, the user can only select the type of alert desired, e.g., audible alert or silent alert, for the entire selective call receiver. Typically, the user enters the selection via user controls in the selective call receiver.

Modern selective call services are capable of sending multiple types of information, for example, stock market, weather, sports, news or other information periodically to a subscribing selective call device (receiver and/or transmitter). Before long, hundreds of information services are likely to be transmitted to selective call devices. With this rapid expansion, the number of services will easily exceed the amount of information a user of a selective call device can easily receive based upon the limitation of the number of messages which is subject to the number of address ports and the storage capacity. Additionally, there will be a cost associated with the reception of these information services.

Thus, what is needed is a method of selecting and receiving different information services from a list of available information services during a predetermined time period.

DESCRIPTION OF A PREFERRED EMBODIMENT

Figure 1:
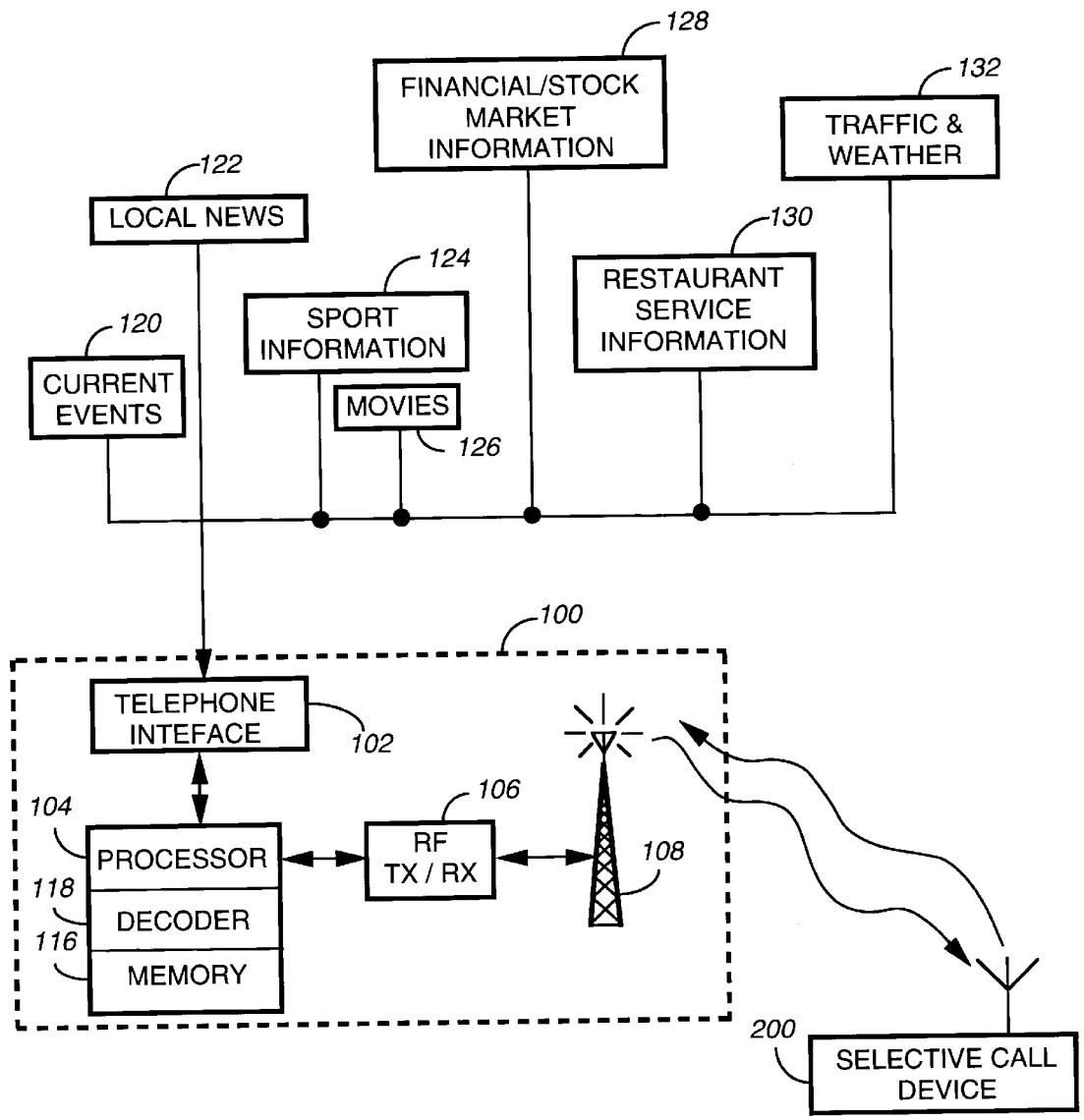
FIG. 1 is an electrical block diagram of a selective call system receiving a plurality of information services in accordance with a preferred embodiment of the present invention.

Referring to FIG. 1, a block diagram of a communication system or selective call system is shown in accordance with the preferred embodiment of the present invention. Preferably, the communication system (or selective call system) comprises a base station (base site or selective call terminal) 100 including a radio frequency (RF) transmitter/receiver (RF TX/RX) 106 capable of transmitting and receiving information in a manner well known to one skilled in the art. The transmitter/receiver 106 is coupled to a base site processor 104. The base site processor 104 has a decoder 118 for decoding information services and/or other messages received via a telephone interface 102 and/or the transmitter/receiver 106 and a memory 116 which stores, among other things, information relating to a plurality of information service providers (or information services or information service files) 120–132. The processor 104 generates a list or directory to identify the information services that are available during a particular time. The directory includes, for example, the type and title of the information services. The directory can also note which information service (subscription information) that requires a subscription fee to be received. An information that is available during a predefined period of time with a cost associated with the right to receive it is sometimes referred to as "pay-per-view" information. The "pay-per-view" information is transmitted to the selective call device 200 on an assignable sub-address port that is enabled for the reception of the "pay-per view" information or pay-per-view service during the predefined time the information is being transmitted to a subscriber unit or selective call devices 200.

The plurality of information service providers 120–132 are preferably coupled to a telephone interface 102 which is coupled to the processor 104. Those skilled in the art will appreciate that plurality of information service providers 120–132 can be received as radio frequency signal by the antenna 108.

When the base site processor 104 receives information from the plurality of information services 120–132, the information generally comprise the title of the information service which is stored in the memory 116 and a list or directory of the information services 120–132 is generated. The plurality of information services 120–132, as shown, are coupled to the processor 104 via the telephone interface 102 and is periodically transmitted and updates are store in the memory 116. A message is generated by the processor 104 that includes at least the directory of information services which is broadcasted to at least one selective call device (receiver or transceiver) 200 on a predetermined address port or preassigned communication address port, for example a group or mail drop address.

Specifically, when an information service provider decides to offer information services ("pay-per-view") for sale via a selective call system, the base site processor 104 receives and generates a selective call message including the information services being offered for sale. The list of information or directory of information services is broadcasted to a plurality of selective call devices or subscriber units 200 on an information service address that is programmed in all selective call devices or subscriber units 200 to receive the broadcasted directory of information. This directory of information services, for example, contains (1) a message announcing the new service, (2) embedded multiple choice responses (MCR) corresponding to each service to be displayed as choices to the user, and (3) embedded information about the sub-address that each service will be offered and the duration (time, number of pages etc.) of the subscription to that service. The cost for the service can also be included. An MCR contains a series of selections that allow the users to select which information service to subscribe to or not to subscribe to by simply making and transmitting the selection back to the service provider.

When the selective call device or subscriber unit 200 receives the list of information services, and in response to a user selection, the selective call device 200 transmits the MCR selection to the selective call system requesting information relating to a selected information service. The base station 100, upon receipt of the selected MCR, determines whether the user (selective call device 200) requesting same is authorized to receive the information service. It will be appreciated by one of ordinary skill in the art that the selective call processor determines if the subscriber is authorized by determining, e.g., if the subscriber is current in his payments or if the subscriber is registered on the system, etc. If the subscriber unit is not authorized, access is denied. The user, optionally, is informed of what things are to be done before access will be granted, for example the payment of an access or subscription fee. If the user has access to the information service selected from the plurality of information service files, the information service is transmitted by an antenna 108 to assignable sub-address port of the selective call device 200.

Figure 2:
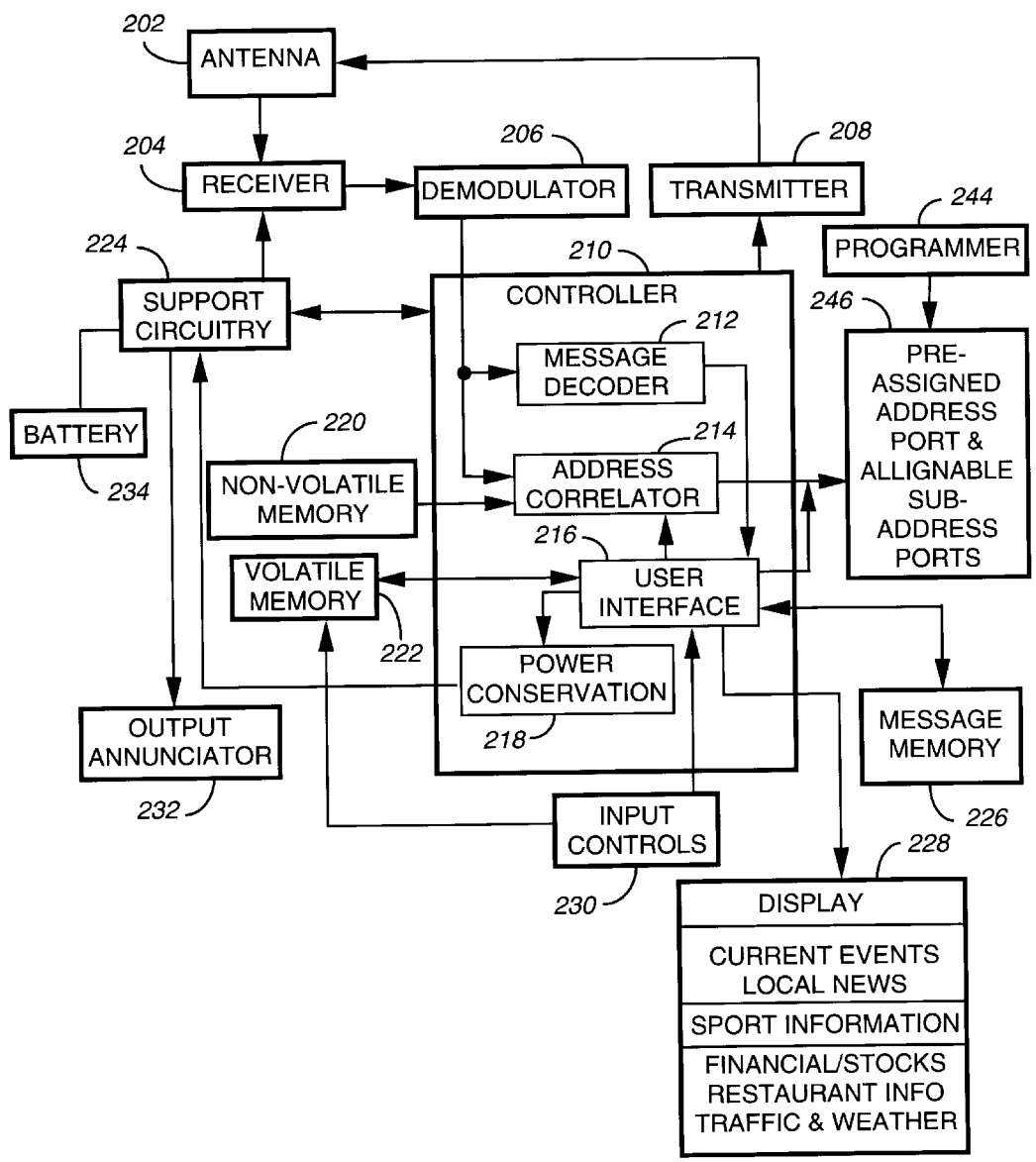
FIG. 2 shows a block diagram of a selective call device according to the preferred embodiment of the present invention.

FIG. 2 shows a block diagram of a selective call device according to the preferred embodiment of the present invention. The selective call device or subscriber unit 200 is powered by a battery 234 and operates to receive and to transmit a radio frequency signal via an antenna 202. A receiver 204 is coupled to the antenna 202 to receive the radio frequency signal. A demodulator 206 is coupled to the receiver 204 to recover any information signal present in the radio frequency signal using conventional techniques. The recovered information signal from the demodulator 206 is coupled to a controller 210 which decodes the recovered information in a manner well known to those skilled in the art.

In the preferred embodiment, the controller 210 comprises a microcomputer, e.g., a Motorola, Inc. manufactured microcomputer, e.g., MC68HC05C4, which has a signal processor performing the function of a decoder, which is normally implemented in both hardware and software. The signal processor comprises an address correlator 214 and a message decoder 212, using methods and techniques known to those skilled in the art. The address correlator 214 checks the recovered information signal from the output of the demodulator 206 for address and correlates a recovered address with one of a plurality of predetermined address information that are stored in the selective call device's non-volatile memory 220. When the recovered address correlates with the predetermined address designating a mail drop, broadcast, or group address, the information being received comprises, e.g., the directory or list of information services. The message decoder 212 then decodes the message and displays on a display 228. The user, by using input controls 230, actives the user interface 216 from any one to a plurality of assignable or selectable sub-address ports 246. Also, using the input controls 230, the user is able to select, in a manner well known in the art, each MCR to indicate to the system the information services desired.

With each information service, there is an assignable sub-address port previously designated or assigned to enable the reception of a particular information service. When the information is display, each available information service is displayed with an assignable or selectable sub-address port. The information or message includes the MCRs that are received and displayed by the selective call device 200. The user selects one or more of the MCR's and the user's MCR selection(s) is (are) transmitted by the transmitter 208 of the selective call device 200 back to the selective call system 100. In particularly, the controller 210 encodes the MCR selection into an acknowledge-back message that is sent by the transmitter 208 to the system, preferably, the processor 104. The selective call device 200 then waits for authorization from the system for each MCR response that was transmitted. When the base site processor 104 receives the Multiple Choice Response message for each MCR selected, it retains the sub-address and duration for each MCR response.

According to the preferred embodiment of the present information, when the selective call system, in particular the processor 104, receives MCR selection, it generates an authorization message which is transmitted to the selective call device 200 indicating that the selective call device 200 is now authorized to receive the service. The system updates its billing information so that the selective call device or subscriber unit 200 can be charged appropriately for the information service it receives. However, if access is denied, the user is informed of what things are to be done before access will be granted, for example, the payment of an access or subscription fee. If the user has access to the information service selected from the plurality of information service files, the information service is transmitted by an antenna 108 to the user at the assignable sub-address port identified.

When the selective call device 200 receives the authorization from the selective call system, it enables the sub-address corresponding to the service that was selected. Preferably, the selective call device 200 also uses the duration information to schedule automatic disabling of the sub-address at the end of the service subscription. The sub-address is enabled by a programmer 244 that programs or reprograms the designated assignable sub-address port 246 associated with the selected information for which authorization was received. Status information are stored in a memory 222, for example, a volatile memory or electrically erasable memory indicating that the selectable or assignable address port is programmed or assigned to receive the selected information.

Optionally, when the selective call device 200 receives authorization, it can transmit an additional response to the selective call system to indicate its receipt of the system's authorization. This could prevent accidental billing in the event that the selective call device 200 did not receive the selective call system's authorization thus preventing the selective call system from billing the subscriber unit 200 until this acknowledgment was received.

In this way, the selective call system sends (or broadcasts) a list or a directory of "pay-per-view" information services on an information service address enabled in all selective call devices or subscriber units 200. However, when the user has selected a particular information service to be received, the selected information is transmitted to the selective call device on one of the assignable sub-address port designated by the information service. This assignable sub-address port is different from the preassigned information address port on which the original message or directory of information service was received. Only the selective call device 200 that has subscribed via the above process will have that sub-address enabled to receive the selected information service. When the term of the subscription has expired, the selective call device is programmed to automatically disable the corresponding assignable sub-address port.

Advantageously, the user of the selective call device 200 can control which information to receive and when to receive the information by selecting the desired information service from the MCR for enabling the selection of information services 120–132. The user can receive any of the information services by selecting or reselecting an information service designated for a one of the assignable sub-address port from which the selection is made. Accordingly, the user can receive more than one information service, and the number of information services capable of being received is limited to the number of selectable address ports 246.

After receiving, decoding, and storing the selected information service in a message memory 226, the selective call device 200 typically presents at least a portion of the stored message to a user, such as by a display 228, e.g., a liquid crystal display. Additionally, along with receiving, decoding, and storing the information, an alert is presented to the user via an output annunciator 232. The alert can include an audible alert, a visual alert, a vibratory or silent alert, or a combination of the aforementioned alerts, using known methods and techniques.

A support circuit 224 preferably comprises a conventional signal multiplexing integrated circuit, a voltage regulator and control mechanism, a current regulator and control mechanism, audio power amplifier circuitry, control interface circuitry, and display illumination circuitry. These elements are arranged to provide support for the functions of the selective call device 200 as requested by a user.

Additionally, the controller 210 determines from the enabled or disabled status information in the memory 222 whether to conserve power upon detection of an address information. That is, when a received and recovered address information correlates with a predetermined address in the non-volatile memory 220, the controller 210 checks the status information corresponding to the correlated predetermined address information to determine whether that address is enabled. If the controller 210 determines that the correlated predetermined address is not enabled then the message decoder 212 is not invoked. Further, the controller 210 signals a power conservation module 218 to begin conserving power for the selective call device 200. The power conservation module 218 signals circuitry in the support circuit 224 to enter a low power mode (battery save mode). A number of power consuming circuits may be directed to a low power or standby mode of operation. Additionally, the signal from the power conservation module 218 signals, or strobes, the receiver 204 to a low power mode to conserve power. In this way, when a correlated address is not enabled, as indicated by the associated status information, the selective call device 200 conserves power immediately, while not decoding an associated message and also not storing the message in message memory 226. Of course, the power conservation module 218 will re-enable the receiver and other circuits at some later time. Methods of power conservation strobing in selective call devices are known to those skilled in the art. Further, the controller 210 inhibits any alerts to the user via the output annunciator 232. By not alerting again, power conservation is maximized. The status information, corresponding to each predetermined address information stored in the volatile memory 222, allow the controller 210 to disable functions in the selective call device 200, and to conserve power when a correlated address is disabled, e.g., when no information service is selected for the assignable sub-address port.

In this way, when a user receives a message offering the coverage of, e.g., a sporting event or game, each event will be shown as a multiple choice selection in the message. When the user desires, e.g., The Dolphin's football game, s/he selects it from the MCR. The MCR selection is transmitted to the selective call system by the selective call device or subscriber unit 200. The selective call device waits for a grant or authorization from the selective call system, communication system or service provider, and upon reception of the authorization, the selective call device enables the assignable sub-address port associated with the information service selection. During the game, updates are transmitted to the selective call device on the assignable sub-address port that was enabled. At the end of the game, the selective call device that subscribed to the service unilaterally disables that assignable sub-address port. Thereafter, the system will bill the user for the subscription of the service. Therefore, by offering information services in this way, the service providers can charge users for the information services on an "as used" basis.

Figure 3:
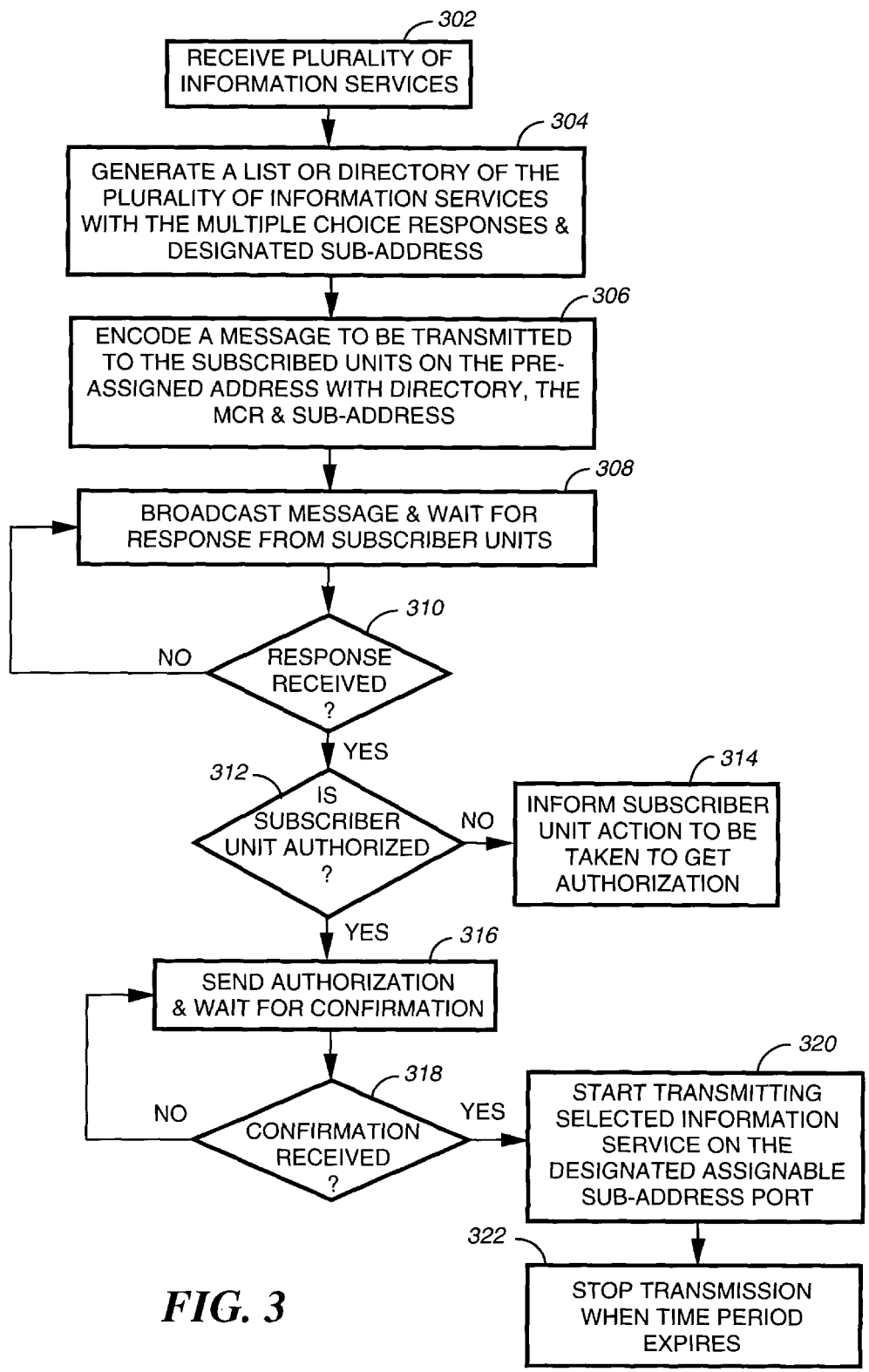
FIG. 3 a flow diagram of the selective call system of FIG. 1 illustrating the steps providing information.

FIG. 3 is a flow diagram illustrating the steps of transmitting a directory of information services in accordance with the selective call system (or communication system) of FIG. 1. As shown, the communication system receives a plurality of information services, step 302 and generates a list or directory of information listing the plurality of information services including the multiple choice response (MCR) and designated sub-addresses associated with each of the plurality of information services being received, step 304. A message is encoded with the topic or listing of the information services, the MCRs, the sub-address designations or assignments, and possibly the time periods associated with information services including the cost for the subscriptions, step 306. The message is then encoded with the preassigned information address and broadcasted to all subscriber units or selective call devices that are programmed to receive information services, step 308. Also in step 308, the processor waits for responses from the subscriber units that wish to subscribe to any of the available information services.

The communication system checks if a response from any of selective call device 200 is received, step 310, and if not, the communication system continues to wait, step 308. If an information service request is received in step 310, the base site 100 determines if the subscriber unit is authorized to subscribe and to receive the information being requested by decoding the MCR to determine the information service that is requested, step 312. If the subscriber unit is not authorized, step 312, the base site processor informs the subscriber unit by transmitting a message to the subscriber unit describing the action that must be taken before the subscriber unit can subscribe to the desired information service, step 314. When the subscriber unit is authorized, step 312, the base site processor transmits an authorization to the requesting selective call device, step 316. Optionally, the base site can wait for an acknowledgment from the subscriber unit to indicate that it has received the authorization, step 318. Thereafter, the communication system begins transmission of the selected information service to the selective call device on the designated assignable sub-address port, step 320. When the predetermined time period has expired for the transmission of the information service, the base site ceases transmission, step 322.

Accordingly, the communication system or base site that receives information services from a plurality of information sources can bundle these services and offer them to subscribers. To provide the subscribers with a choice, the communication system transmits the title or type of services being offered to the plurality of portable communication devices on preassigned communication address, a group or mail drop address so all the portable communication devices can receive the directory of the information services. To further improve system time, the directory can be transmitted during time when the through-put on the channel is low, for example at nights.

Figure 4:
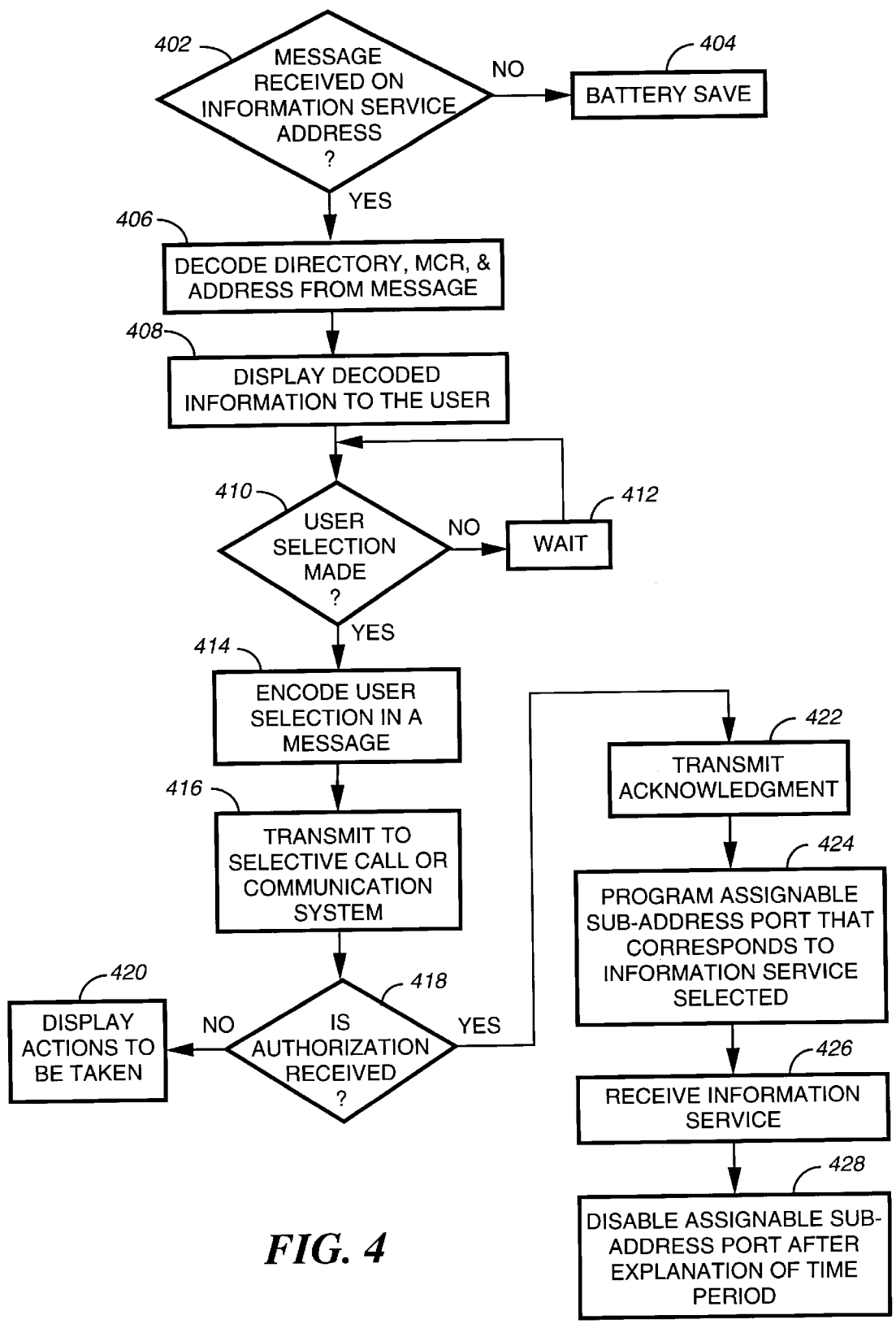
FIG. 4 a flow diagram of the selective call device of FIG. 2 illustrating the steps of subscribing to available information services.

FIG. 4 is a flow diagram illustrating the steps for subscribing to information services in accordance with the selective call device of FIG. 2. Subsequent to the power-up sequence, the portable communication device or selective call device checks if a message or an information service is received on the information service address, step 402, and if not, the selective call device initiates its battery save routine, step 404. When selective call device or subscriber unit detects its address, it receives the directory of information services, the MCR and designated assignable sub-address on the preassigned address port, mail drop or group address, step 402. The received message or information service is decoded, step 406 and displayed on a display to enable to user to decide whether to subscribe to any of the available information service, step 408. In step 410, the controller 210 checks whether the user has made a selection via the MCR. If not, the controller waits for a user response, step 412. When the user has selected to receive at least one of the available information service by making the selection via the MCR, step 410, the MCR is encoded into a message, step 414, which is transmitted to the base site, step 416. When the base site receives the user selection, it decodes the MCR to determine which information service of the plurality of information services was selected. The base site processor then retrieves the record of the requesting subscriber to determine is authorized to receive the requested information, e.g., if the subscriber has a good credit standing, step 418. If the subscriber is not authorized, the base site processor encodes a message which is transmitted to the subscriber unit to inform it that it is not authorized and describe the actions needed to be taken before it is able to receive the requested information service. The selective call device displays the message indicating the actions to be taken, step 420. On the other hand, when the subscriber unit is authorized, step 418, the authorization is transmitted to the subscriber unit, step 422. The selective call device programs the designated assignable sub-address port when it has received the authorization from the base site, step 424. Optionally, the selective call device can also transmit a confirmation back to the base site to confirm the receipt of the authorization. The confirmation can eliminate the service provider from billing the subscriber when authorization was not received by the selective call device. After the receipt of the authorization, the selective call device begins to receive the requested information on the designated information service address port, step 426. Subsequent to the expiration of the time period of the subscription, the selective call device disables or reprograms the assignable sub-address port and ceases to receive the information service, step 428.

In this way, a communication system receives information services from a plurality of information services and generates a directory or list of the information services and transmits the directory to a plurality of portable communication devices (subscriber units) on preassigned communication address (or a mail drop or group address) port. The plurality of portable communication devices receive the directory of information services and the user selects via a multiple choice response (MCR) which is included with the information whether he wants to subscribe to any of the available information service. Upon a MCR selection, the selective call device transmits the selection to the base site which in turn transmits an authorization back to the selective call device. When the selective call device receives the authorization, it programs the designated assignable sub-address port corresponding to the selected information service. Thereafter, the information is received on the programmed assignable sub-address port which is different from the preassigned address port on which the directory of information services was received.

Therefore, a service provider can offer broadcast information listing of available information services on a "pay-per-view" service by allowing the subscriber units to program itself to receive the selected information on an assignable sub-address port for the duration the information is being broadcasted. When the duration has expired, the subscriber unit disables the assignable or programmable sub-address port. The method allows the service provider to advertise available information services, charge only those subscriber who elects to receive the information service via a return channel. The service provider can monitor the type of services that are being requested to tailor its future offerings to maximize the communication channels based upon the subscribers' desire without burdening the channel with over-the-air programming.

In summary, a selective call communication system has at least one base site and a plurality of subscriber units. The at least one base site comprises a base site receiver for receiving information services, a base site processor for processing the information services and creating a directory of information services to be received on designated address assignments. A base site transmitter transmits the directory of information services and the designated address assignments to a subscriber unit. The subscriber unit comprises a preassigned information address port and at least one assignable sub-address port, a receiver receives the directory of information services and the designated address assignments on the preassigned information address port, a user interface enables a selection of an information service from the directory of information services and a controller generates a request for a selected information service. A transmitter transmits the request for the selected information service to the base site processor and a programmer programs an assignable sub-address port corresponding to a designated address assignment for receiving the selected information service in response to a receipt of an authorization from the base site processor. The controller automatically disables the assignable sub-address port for receiving the selected information service subsequent to an expiration of a time period.

I claim:

1. A selective call communication system having at least one base site and a plurality of subscriber units, the at least one base site, comprising:

a base site receiver for receiving information services;

a base site processor for processing the information services and creating a directory of information services including interval of times during which corresponding information services are authorized to be received on designated address assignments;

a base site transmitter for transmitting the directory of information services, the interval of times during which corresponding information services are authorized and the designated address assignments to a subscriber unit, the subscriber unit, comprising:

a preassigned information address port and at least one assignable sub-address port;

a receiver for receiving the directory of information services the interval of time the information service are authorized, and the designated address assignments on the preassigned information address port;

a user interface for enabling a selection of an information service from the directory of information services;

a controller for generating a request for a selected information service;

a transmitter for transmitting the request for the selected information service to the base site processor;

a programmer for programming an assignable sub-address port corresponding to a designated address assignment for receiving the selected information service in response to a receipt of an authorization from the base site processor; and said controller automatically disables the assignable sub-address port for receiving the selected information service subsequent to an expiration of the interval of time.

2. The selective call communication system according to claim 1 wherein the base site processor encodes a message comprising the directory of information services, the designated address assignments, and time periods during which the information services are authorized for reception.

3. The selective call communication system according to claim 2 wherein:

the base site processor determines when the information service requested is a pay-per-view service; and the base site transmitter transmits subscription information to the subscriber unit.

4. The selective call communication system according to claim 3 wherein the controller activates a display for displaying the directory of information services, the requested pay-per-view information service and time periods for the information services.

5. The selective call communication system according to claim 1 wherein the subscriber unit transmits a confirmation in response to the receipt of the authorization.

6. The selective call communication system according to claim 1 wherein the base site processor waits for a confirmation from the subscriber unit subsequent to a transmission of the authorization.

7. In a communication system, a method for dynamically selecting information services being provided to a subscriber unit assigned thereto, comprising the steps of:

transmitting a directory of information services and interval of times during which corresponding information services are authorized to the subscriber unit and designating address assignments for the information services;

receiving a selection from a subscriber unit for a subscription to an information service identified in the directory of information services;

determining whether the subscriber unit is authorized to receive an information service request, the method in the subscriber unit comprising the steps of:

receiving the directory of information services and designated address assignments at a preassigned address port;

selecting an available information service from the directory of information services;

transmitting a selection of the available information service;

programming an assignable sub-address port corresponding to a designated address assignment in response to a receipt of an authorization;

receiving the available information services and the interval of times during which the available information services are authorized on the assignable sub-address port; and disabling the assignable sub-address port when the interval of time has expired for the available information service being subscribed thereto.

8. The method according to claim 7 further comprising a step of encoding a message comprising the directory of information services, the designated address assignments, and time periods during which the information services are authorized for reception.

9. The method according to claim 7 further comprising the steps of:

determining when the information service requested is a pay-per-view service; and transmitting subscription information to the subscriber unit.

10. The method according to claim 9 further comprising the steps of displaying the directory of information services, the requested pay-per-view information service and time periods for the information services.

11. The method according to claim 7 further comprising the step of transmitting a confirmation in response to the receipt of the authorization.

12. The method according to claim 7 further comprising the step of waiting for a confirmation from the subscriber unit subsequent to a transmission of the authorization.

13. A selective call device, comprising:

a preassigned address port and a plurality of assignable sub-address ports;

a receiver for receiving a directory of information services, interval of times during which corresponding information services are authorized, and designated address assignments corresponding to the directory of information services on the preassigned address port;

a user interface for selecting an information service from the directory of information services to be received on an assignable sub-address port corresponding to a designated address assignment;

a transmitter for transmitting a selection of a selected information service;

a programmer for programming the assignable sub-address port in response to a receipt of an authorization and for disabling the assignable sub-address port when the interval of time for the selected information service has expired; and a receiver for receiving the selected information services and interval of times during which corresponding information services are authorized on the assignable sub-address port.

14. The selective call device according to claim 13 further comprises a controller that activates a display for displaying the directory of information services, requested pay-per-view information services, and time periods for the information services.

15. The selective call device according to claim 13 wherein the transmitter transmits a confirmation in response to the receipt of the authorization.

16. In a subscriber unit for subscribing information services, a method for dynamically selecting information services comprising the steps of:

receiving a directory of information, interval of times during which selected information services are authorized, and designated address assignments associated with the directory of information services being provided on a preassigned address port;

selecting an information service from the directory of information services;

transmitting a request for the information service being selected;

programming an assignable sub-address port to receive the information service being selected in response to a receipt of an authorization;

receiving the information service and the interval of times during which selected information services are authorized on the assignable sub-address port; and disabling the assignable sub-address port when the interval of time period for the selected information service has expired.

17. The method according to claim 16 further comprising the step of activating a display for displaying the directory of information services, requested pay-per-view information services, and time periods for the information services.

18. The method according to claim 16 wherein the step of transmitting transmits a confirmation in response to the receipt of the authorization.

\* \* \* \* \*